US006744348B2

(12) United States Patent
Marino et al.

(10) Patent No.: US 6,744,348 B2
(45) Date of Patent: Jun. 1, 2004

(54) SECURITY SYSTEM UTILIZING GROUP SUPERVISION POLLING

(75) Inventors: Francis C. Marino, Dix Hills, NY (US); Tony Tung Sing Li, Roslyn Heights, NY (US)

(73) Assignee: Honeywell International Inc., Morristown, NJ (US)

( * ) Notice: Subject to any disclaimer, the term of this patent is extended or adjusted under 35 U.S.C. 154(b) by 412 days.

(21) Appl. No.: 09/861,129

(22) Filed: May 18, 2001

(65) Prior Publication Data

US 2002/0174343 A1 Nov. 21, 2002

(51) Int. Cl.[7] .......... G05B 23/02

(52) U.S. Cl. .......... 340/3.1; 340/3.42; 340/3.43; 340/3.5; 340/3.51; 340/3.52; 340/3.53; 340/3.54; 340/500; 340/504; 340/573.1; 370/449; 370/451; 370/455

(58) Field of Search .......... 340/573.1, 3.1, 340/3.42, 3.43, 3.5, 3.51, 3.52, 3.53, 3.54, 825.52, 500, 504, 501; 370/449, 451, 455; 700/296; 702/183

(56) References Cited

U.S. PATENT DOCUMENTS 4,964,058 A * 10/1990 Brown, Jr. .......... 700/296
5,268,668 A 12/1993 Berube
5,323,307 A 6/1994 Wolf et al.
5,347,515 A * 9/1994 Marino .......... 370/447
5,543,778 A 8/1996 Stouffer
5,864,286 A * 1/1999 Right et al. .......... 340/501
5,909,591 A * 6/1999 Brooke .......... 710/9
5,962,992 A 10/1999 Huang et al.
6,015,091 A 1/2000 Rockstein et al.
6,108,614 A * 8/2000 Lincoln et al. .......... 702/183

* cited by examiner

*Primary Examiner*—Michael Horabik
*Assistant Examiner*—Yves Dalencourt
(74) *Attorney, Agent, or Firm*—Anthony R. Barkume, P.C.

(57) ABSTRACT

In a security system that has a large number of individually-addressable modules interconnected on a data bus to a control panel, a method of concurrently supervising the modules by first configuring each module with a unique zone number including a group number and a module number. During operation, the control panel initiates a group supervision poll sequence for each group number by transmitting a group poll command including a group number data field populated by the group number currently being polled. If a module is part of the group being polled, then it sets a discrete bit appended to a group poll response message that logically corresponds to the module number for that module. The control panel then determines if any bit in the group poll response message has not been set, and then issues a unit poll sequence addressed to a module that corresponds to any such bit not determined to have been set in the group poll response message.

14 Claims, 3 Drawing Sheets

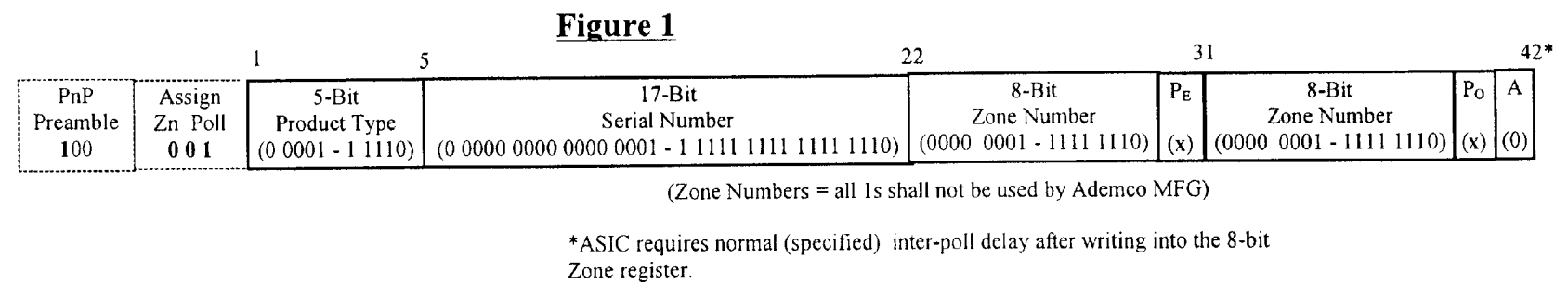

| | | 1 | 5 | 22 | 31 | | | 42* |
|---|---|---|---|---|---|---|---|---|
| PnP Preamble 100 | Assign Zn Poll 001 | 5-Bit Product Type (0 0001 - 1 1110) | 17-Bit Serial Number (0 0000 0000 0000 0001 - 1 1111 1111 1111 1110) | 8-Bit Zone Number (0000 0001 - 1111 1110) | $P_E$ (x) | 8-Bit Zone Number (0000 0001 - 1111 1110) | $P_O$ (x) | A (0) |

Figure 1

(Zone Numbers = all 1s shall not be used by Ademco MFG)

*ASIC requires normal (specified) inter-poll delay after writing into the 8-bit Zone register.

SECURITY SYSTEM UTILIZING GROUP SUPERVISION POLLING

FIELD OF THE INVENTION

This invention relates to a method and system for polling a large number of security system modules interconnected on a bus with a control panel in groups so as to reduce the overall polling time.

BACKGROUND OF THE INVENTION

Security systems that comprise a number of devices, or modules, interconnected to a control panel by a communications bus, are well known in the art. Security modules typically are used to monitor an area of space or a specific access point, and report to the control panel if there is a change in status. For example, modules exist that monitor opening of doors or windows, that determine if an intruder has entered the premises such as by passive infrared surveillance techniques, or that determine if a fire has started, etc. Since most of these types of devices only report changes in status when a triggering event occurs, and a triggering event such as a fire may never in fact occur, it is important to poll or query each module on some periodic basis in order to ensure that they are up and running. This polling process is referred to as supervision of the modules, and generally is carried out by the control panel querying each module individually to determine at least if it is capable of sending a response back to the panel. If any given module does not report back, then the system will provide a warning to the system operator or monitoring company that the module needs to be investigated.

In present security systems which employ unique serial number addressing for each module, the minimum time required to unit poll a single module in the system is a function of how many bits at, say 1 Kbaud, are contained in the unit poll message. This can be as much as 50 ms for a 37-bit unit poll including the required time of an inter-poll delay. Unit polls are required to supervise, or interrogate the proper functioning, of every module in the system. In a system containing 250 modules, it will take (50 ms)(250)= 12.5 sec for the control panel to supervise every module in that system. If any one of the modules become inoperative (non-responsive to the unit poll) it would take the control panel an average of 12.5/2=6.25 sec and a maximum of 12.5 seconds to identify and report that defective module to the user and/or the monitoring company's central station.

In certain applications, this polling time is unacceptable. For example, in Europe, defective modules are required to be identified and reported in less than 2–4 seconds. It is anticipated that such a requirement will eventually become a domestic requirement once it has been demonstrated that fast polling systems exceeding 9600 baud are common place. It is therefore desired to be able to effect a poll of a substantially large number of modules in a relatively shorter amount of time, that is, to be more efficient than the prior art sequential unit poll scenario currently being implemented.

SUMMARY OF THE INVENTION

This invention reduces the supervision time by a substantial factor via unique group supervision polling. In the preferred embodiment below, the maximum supervision time is reduced by a factor of 16 (from 12.8 seconds to 12.8/16=0.8 second, reducing the average supervision time to only 0.4 second). This is accomplished in a security system that has a large number of individually-addressable modules interconnected on a data bus to a control panel by a method of concurrently supervising the modules by first configuring each module with a unique zone number correlated to a group number and a module number. During operation, the control panel initiates a group supervision poll sequence for each group of modules by transmitting a group poll command including a group number data field, with the group number data field being populated by the group of modules currently being polled. Each module responds to the group poll command by first determining if it is a member of the group currently being polled by comparing the group number data field to the group number portion of the zone number with which it has been previously configured. For each module that is a member of the group being polled, a discrete bit is set in a group poll response message that logically corresponds to the module number for that module. The control panel then determines if any bit in the group poll response message has not been set, and then issues a unit poll sequence addressed to a module that corresponds to any such bit not determined to have been set in the group poll response message.

Each module may be configured with a unique zone number by first logically dividing the plurality of modules into n groups of modules, then assigning a group number to each group of modules and assigning a module number to each module within a group. The control panel transmits to each module a data string including a zone number, with the zone number assembled from the group number and the module number assigned to that module, and the zone number is stored by each module for later use. Each module is individually addressable by a unique serial number that was previously stored therein.

For example, the zone number may be an eight-bit data word comprised of a four-bit group number and a four-bit module number.

BRIEF DESCRIPTION OF THE DRAWING

FIG. 1 is a diagram of the Assign Zone Poll Command.

DETAILED DESCRIPTION OF THE INVENTION

Figure 3:
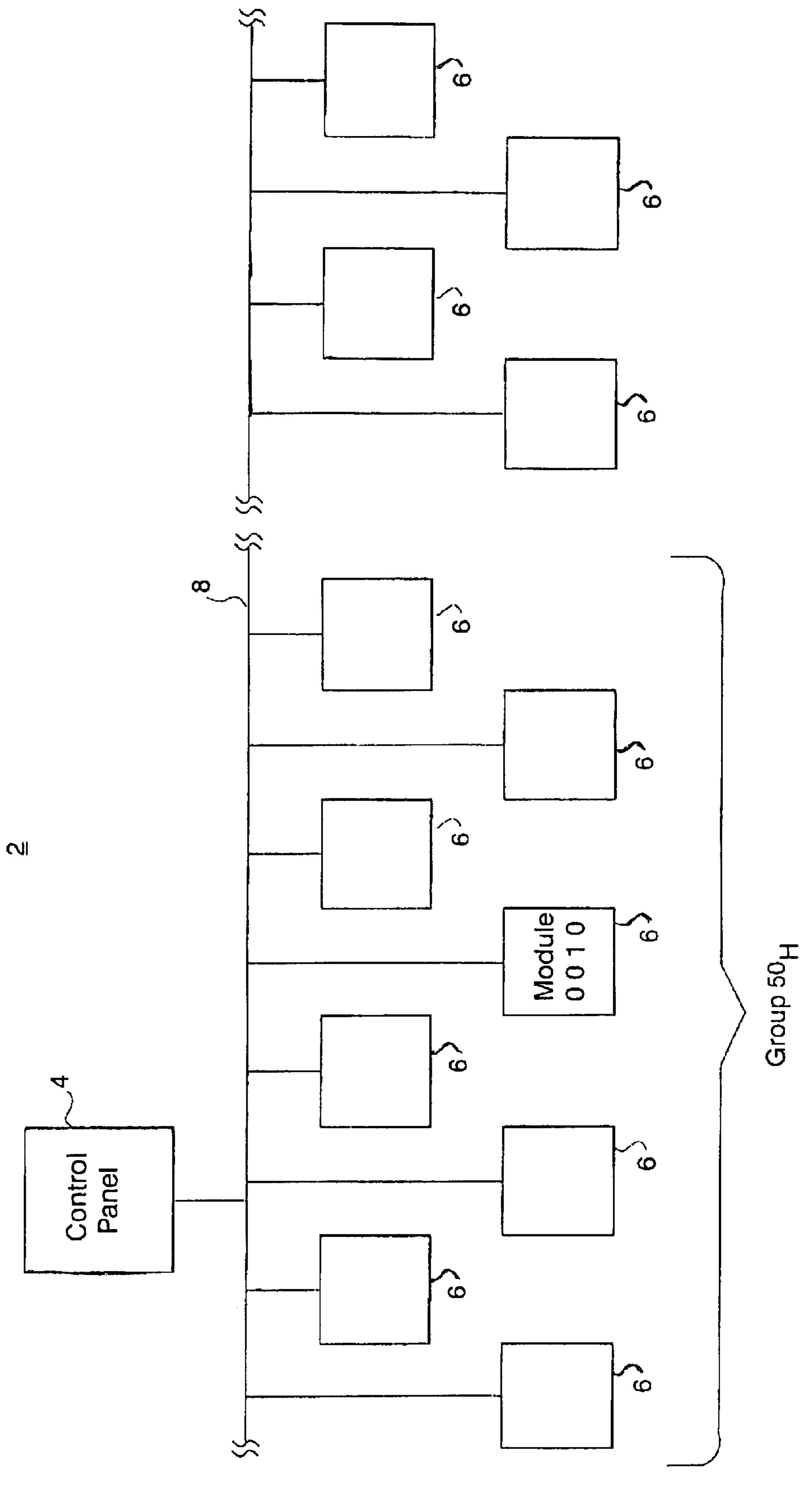
FIG. 3 is a block diagram of the system.

The preferred embodiment of the present invention will now be described. FIG. 3 illustrates a typical layout of a security system 2, which includes a control panel 4, a number of security modules 6, all of which are interconnected for data communications with the control panel 4 by a common data bus 8. The control panel 4 communicates with the modules 6 by means of a 37-bit serial data stream, which includes a preamble that defines the type of message being sent, and then various data fields that will vary as a function of the message being sent. One type of message that could be sent in this system is a serial number unit poll, where each module is individually addressed via a unique 17-bit serial number field in the message. The module that corresponds to the unique serial number in the message will respond by controlling certain other bits of the 37-bit message to indicate certain module functionality, status changes, etc. As mentioned previously, the unit poll methodology is beneficial in that it enables the control panel to extract detailed information from a specific module indicated in the serial number address field. However, since there are many modules that would need to be polled, such individual polling techniques can be unduly lengthy, and the total time incurred to poll each individual module is unacceptable.

Thus, a new type of polling methodology is utilized by the present invention by grouping certain modules together and instituting group polls to supervise them concurrently. The control panel 4 first assigns a unique 8-bit zone number (or alias) to each module 6 by issuing an Assign Zone Poll command as illustrated in FIG. 1, which is then stored in an ASIC circuit register in each module 6. The 8-bit zone number is correlated to that module's factory-configured unique serial number that is stored in the ASIC's non-volatile memory (EEROM). Thus, every module will have its own zone number programmed therein.

The 8-bit zone number is actually comprised of two 4-bit portions, wherein the 4 most significant bits of the 8-bit zone number are the module group number, and the 4 least significant bits are the module number within that group. With an 8-bit zone number, a total of 16 groups of 16 modules, or 256 total modules, can thus be identified in this way.

Figure 2:
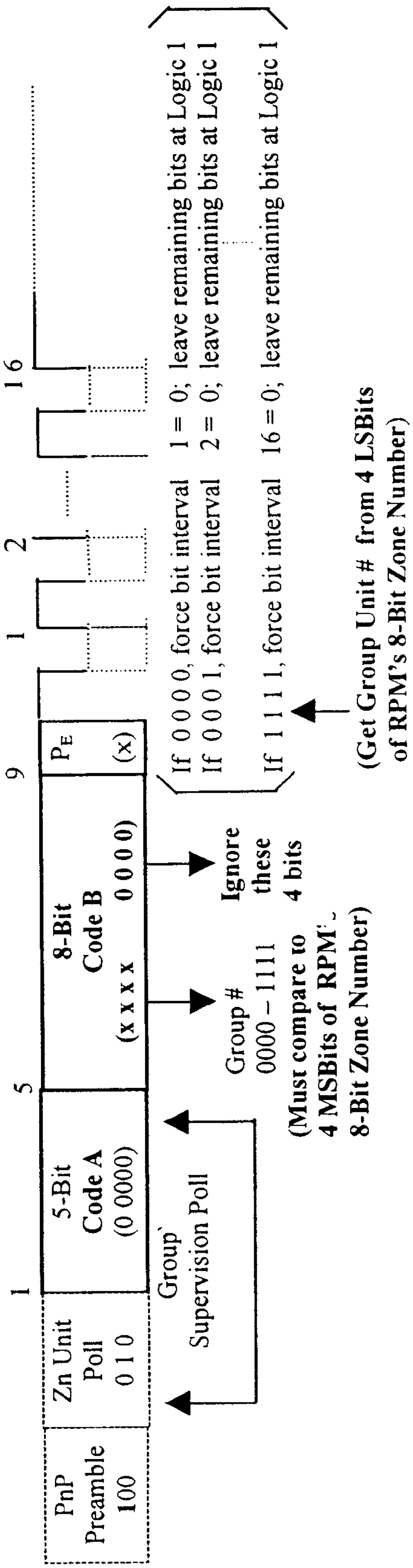
FIG. 2 is a diagram of the Group Supervision Poll command.

The Group Supervision Poll, illustrated in FIG. 2, is then employed by the control panel to supervise up to 16 different modules at the same time. If the 8-bit zone address of a particular module is, for example, $50_{HEX}$ (0101 0000), that means it is module number 0 in group number 5. As a consequence of a Group 5 Supervision Poll, all (up to 16) modules within group 5 are concurrently addressed. Transponder number 0 of group number 5 will respond by only pulling appended bit number 1 low (to logic 0). Other modules in the same group number 5 will also pull down their appropriate bit; i.e., bit 1 if it is module number 0 (0000), bit 2 if it is module number 1 (0001), . . . bit 16 if it is module number 15 (1111). Thus, each module in a given group is required to acknowledge the supervision group poll by pulling down a discrete bit that corresponds to its logical module number previously assigned.

Therefore, in order for a module to pass the Group Supervision Poll, it must correctly receive all of the data bits shown in FIG. 2, including the correct parity bit. It must then favorably compare the 4 MSBs of the 8-bit Code B with the 4 MSBs of its pre-assigned 8-bit zone number in its circuit register. This is the Group Number comparison. If this succeeds, it must then, and only then, pull down low (to logic is 0) one of the 16 appended logic 1 bits corresponding to the 4 LSBs of its pre-assigned 8-bit zone number. This is the one of 16 module numbers within its Group Number. Every Logic 0 bit of the 16 bits appended to this Group Supervision poll is an indication that the corresponding module has positively acknowledged its supervised poll. Normally, all 16 bits will be returned to the control as logic 0 bit intervals indicating that all 16 modules have passed the supervision test. If any one, or more, of the appended bits remain at logic 1, then there is likely a malfunction at that unit and the control panel may decide to address the corresponding module(s) using appropriate serial number unit polling described above.

Each group will be polled by the control panel in the same fashion. Thus, the total time required to poll all of the modules in the system is reduced greatly( by a factor of 16, in the case cited here).

What is claimed is:

1. In a security system comprising a plurality of individually-addressable modules interconnected on a data bus to a control panel, a method of concurrently supervising the plurality of modules comprising the steps of:

a) configuring each module with a unique zone number comprising a group number and a module number;

b) initiating, for each group number, a group supervision poll sequence, wherein each group supervision poll sequence comprises the steps of:

i) transmitting a group poll command comprising a group number data field, the group number data field populated by the group number currently being polled;

ii) each module substantially concurrently responding to the group poll command by:

determining if it is a member of the group currently being polled by comparing the group number data field to the group number portion of the zone number with which it has been previously configured; and for each module that is a member of the group being polled, setting a discrete bit appended to a group poll response message that logically corresponds to the module number for that module; and iii) determining at the control panel if any bit in the group poll response message has not been set.

2. The method of claim 1 wherein the control panel issues a unit poll sequence addressed to a module that corresponds to any such bit not determined to have been set in the group poll response message.

3. The method of claim 1 wherein the step of configuring each module with a unique zone number comprising a group number and a module number comprises the steps of:

i) logically dividing the plurality of modules into n groups of modules;

ii) assigning a group number to each group of modules;

iii) assigning a module number to each module within a group;

iv) transmitting from the control panel to each module a data string comprising a zone number, the zone number assembled from the group number and the module number assigned to that module; and v) storing at each module the zone number for that module received from the control panel.

4. The method of claim 1 wherein each module is individually addressable by a unique serial number previously stored therein.

5. The method of claim 3 wherein the zone number is an eight-bit data word comprised of a four-bit group number and a four-bit module number.

6. A security system comprising:

a) a plurality of individually-addressable modules, each module being configured with a unique zone number comprising a group number and a module number; and b) a control panel interconnected on a data bus to the plurality of modules; the control panel comprising means for initiating, for each group number, a group supervision poll sequence;

means for transmitting, during each group supervision poll sequence, a group poll command comprising a group number data field, the group number data field populated by the group number currently being polled;

wherein each module further comprises means for responding to the group poll command comprising means for determining if it is a member of the group currently being polled by comparing the group number data field to the group number portion of the zone number with which it has been previously configured; and means for setting a discrete bit appended to a group poll response message that logically corresponds to the module number for that module, when that module has determined that it is a member of the group being polled; and wherein the control panel further comprises means for determining if any bit in the group poll response message has not been set.

7. The system of claim 6 wherein the control panel further comprises means for issuing a unit poll sequence addressed to a module that corresponds to any such bit not determined to have been set in the group poll response message.

8. The system of claim 6 wherein each module is configured with a unique zone number comprising a group number and a module number by:

i) logically dividing the plurality of modules into n groups of modules;

ii) assigning a group number to each group of modules;

iii) assigning a module number to each module within a group;

iv) transmitting from the control panel to each module a data string comprising a zone number, the zone number assembled from the group number and the module number assigned to that module; and v) storing at each module the zone number for that module received from the control panel.

9. The system of claim 6 wherein each module is individually addressable by a unique serial number previously stored therein.

10. The system of claim 8 wherein the zone number is an eight-bit data word comprised of a four-bit group number and a four-bit module number.

11. A security system module comprising:

means for being configured with a unique zone number comprising a group number and a module number; and means for receiving a group poll command comprising a group number data field, the group number data field populated by the group number currently being polled;

means for responding to the group poll command comprising means for determining if it is a member of the group currently being polled by comparing the group number data field to the group number portion of the zone number with which it has been previously configured; and means for setting a discrete bit in a group poll response message that logically corresponds to the module number for that module, when that module has determined that it is a member of the group being polled.

12. The module of claim 11 wherein the means for being configured with a unique zone number comprising a group number and a module number comprises:

means for receiving a data string comprising a zone number, the zone number assembled from a group number and a module number assigned to that module; and means for storing the zone number.

13. The module of claim 12 wherein the zone number is an eight-bit data word comprised of a four-bit group number and a four-bit module number.

14. A security system control panel comprising:

means for initiating, for each of a plurality of group numbers, a group supervision poll sequence;

means for transmitting, during each group supervision poll sequence, a group poll command comprising a group number data field, the group number data field populated by the group number currently being polled;

means for receiving a group poll response message;

means for determining if any bit in the group poll response message has not been set; and means for issuing a unit poll sequence corresponding to any such bit not determined to have been set in the group poll response message.

* * * * *